(12) United States Patent
Baker et al.

(10) Patent No.: US 6,458,005 B1
(45) Date of Patent: Oct. 1, 2002

(54) SELECTIVELY COMPLIANT CHUCK FOR LCD ASSEMBLY

(75) Inventors: Richard L. Baker, Hallstead, PA (US); Ronald J. Becker, Endicott, NY (US); Allan O. Johnson, Johnson City, NY (US); Ramesh R. Kodnani, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/357,074

(22) Filed: Jul. 19, 1999

(51) Int. Cl.[7] ............................. H01J 9/00; H01J 9/24
(52) U.S. Cl. ..................... 445/24; 445/60; 349/187
(58) Field of Search ................... 445/24, 60; 349/187

(56) References Cited

U.S. PATENT DOCUMENTS

| | | |
|---|---|---|
| 4,833,542 A | 5/1989 | Hara et al. |
| 5,660,574 A | 8/1997 | Goda |
| 5,711,693 A | 1/1998 | Nam et al. |
| 5,724,121 A | 3/1998 | McKinley et al. |
| 5,829,739 A | 11/1998 | Hofmann |
| 5,875,011 A | 2/1999 | Pierson et al. |
| 6,193,576 B1 * | 2/2001 | Gayner et al. ........... 445/24 |

* cited by examiner

Primary Examiner—Kenneth J. Ramsey
Assistant Examiner—Joseph Williams
(74) Attorney, Agent, or Firm—Whitham, Curtis & Christofferson, P.C.; Lawrence R. Fraley

(57) ABSTRACT

A selectively compliant chuck for assembling tiles into larger LCD displays facilitates alignment between a cover plate and a tile. A linear clutch is positioned between the tile chuck and the tile chuck carrier. This allows each chuck to float in the axis perpendicular to the tile's mating surface. The chuck has freedom to move linearly in this axis, and allows for pitch and roll motion as well. This floating connection can be turned on or off at will. Thus, a tile attached to the chuck can be lowered to intimately contact a cover plate and the chuck will compliantly move for high mating tolerances. Thereafter, the clutch can be locked to fix the chuck in it's current position. In this manner, the tile can be raised so that an adhesive can be applied to the cover plate. The tile can then be lowered back over the adhesive with the clutch locked and alignment maintained.

13 Claims, 3 Drawing Sheets

SELECTIVELY COMPLIANT CHUCK FOR LCD ASSEMBLY

CROSS-REFERENCE TO RELATED APPLICATIONS

This application is related to application Ser. No. 09/082,287, filed, May 19, 1998, herein incorporated by reference.

BACKGROUND OF THE INVENTION

1. Field of the Invention

The present invention generally relates to assembling large area flat panel displays and, more particularly, to a chuck for assembling a plurality of smaller display areas, or "tiles" to form a larger display.

2. Description of the Related Art

Ever larger and flatter display screens are the trend in the display arts. Large, flat screen television and computer displays in particular are in high demand. Bulky cathode ray tubes (CRT), which have provided the basis for traditional displays, are slowly being replaced by thin film transistor (TFT) display technologies. TFT displays are now common in many portable computer applications and are even making an appearance in home theater systems. In comparison to CRT screens, TFT screens are light weight, use less energy, and are flat. In addition, high resolution, high contrast, and good visibility from a wide viewing angle make TFT displays the choice for the emerging high definition television (HDTV) format.

A drawback of TFT displays, and particularly TFT liquid crystal displays (LCD), is a high manufacturing cost and relatively low yield for larger sizes. Therefore, tiling techniques have been developed wherein smaller displays or "tiles" are seamlessly connected to form a larger display area.

Assembly of relatively small liquid crystal display tiles into a larger, seamless display involves the precise mating of the LCD tiles between a cover plate and a back plate. A very critical aspect of the assembly is that the front surface of the tile (the viewing side), when bonded to the cover plate with transparent adhesive, must exhibit a uniform gap between it and the cover plate. This gap must be uniform within each tile and the same for all tiles (four tiles are typically used in an assembly). A typical gap is 0.004±0.002 inches. If the gap is not consistent, the brightness of an image displayed on the completed LCD assembly will not be even across the whole display.

What makes achieving a precise gap difficult is thickness tolerances in the cover plate and tiles. Cover plates may be ±0.004" and tiles can be ±0.003". Also, there may be some warping in the cover plate and tiles since they are very thin, further adding to the challenge.

One solution would be to hold the cover plate flat on a vacuum chuck and the tiles on a similar chuck. This would flatten the components out. However, the problem is that the components are referenced to the surface that contacts the chucks, not the opposite sides. It is the opposite sides that need to be held to an accurate gap relative to each other. Measurement devices could be used to determine the actual position of the mating surfaces and, with precision placement based on these measurements, a controlled gap could be achieved. However, this is costly, slow, and requires the fabrication of very precise hardware.

SUMMARY OF THE INVENTION

It is therefore an object of the present invention to provide a linear clutch which allows a chuck to compliantly move for positioning of a workpiece and thereafter be securely locked in place with minimal force and positioning disturbance.

It is yet another object of the present invention to provide a chuck for assembling individual tiles for an LCD display.

The invention employs a special connection or linear clutch between the tile chuck and the tile chuck carrier. This allows each chuck to float in the axis perpendicular to the tile's mating surface. The chuck has freedom to move linearly in this axis, and allows for pitch and roll motion as well. This floating connection can be turned on or off at will. Thus, a tile attached to the chuck can be lowered over a cover plate and the chuck will compliantly move for high mating tolerances. Thereafter, the clutch can be locked to fix the chuck in it's current position. In this manner, the tile can be raised so that an adhesive can be applied to the cover plate. The tile can then be lowered back over the adhesive with the clutch locked and alignment maintained.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
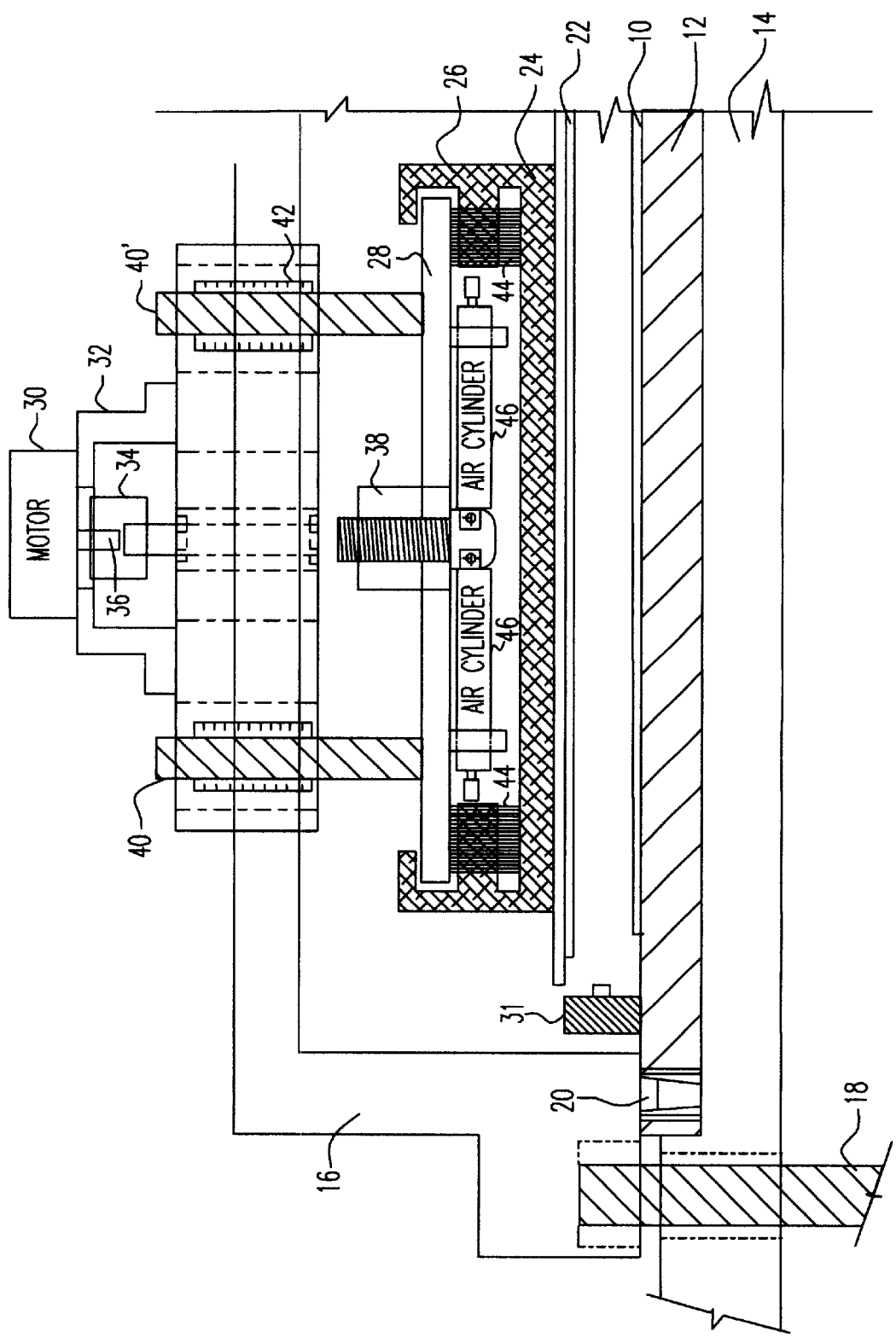
FIG. 1 is a cross-sectional view of the compliant chuck according to the present invention.

Referring now to the drawings, and more particularly to FIG. 1, there is shown a diagram of the compliant chuck for assembling LCD tiles according to the present invention. A cover plate 10 is held flat on top of a vacuum chuck 12 secured to a base 14. A chuck housing 16 slides down on the vacuum chuck 12 on guide post 18 and is aligned with the vacuum chuck 12 by guide pin 20. The LCD tiles 22 are held flat on individual tile chucks 24 with the compliant mount 26 attaching the tile chucks 24 to the tile chuck carrier 28. A motor 30 sits atop a motor mount 32. A coupling 34 connects the motor shaft 36 to a lead screw 38. As the motor 30 turns, the lead screw 38 causes the chuck carrier 28 to move in a vertical direction. The compliant mount 26 is guided by independent guide posts 40 and 40' sliding within ball bushings 42.

The tile chuck carrier 28 is coupled to the compliant mount 26 via a linear clutch 44. The linear clutch 44 comprises interleaved plates attached to the chuck carrier 28 and to the compliant mount 26, respectively. The linear clutch is normally free to allow the compliant mount 26 to compliantly move with respect to the cover plate 10. When pressure is applied to the linear clutch 44, for example by air cylinders 46 and pistons 48, the interleaved clutch plates are forced or squeezed together locking the compliant mount 26 in place.

Figure 2:
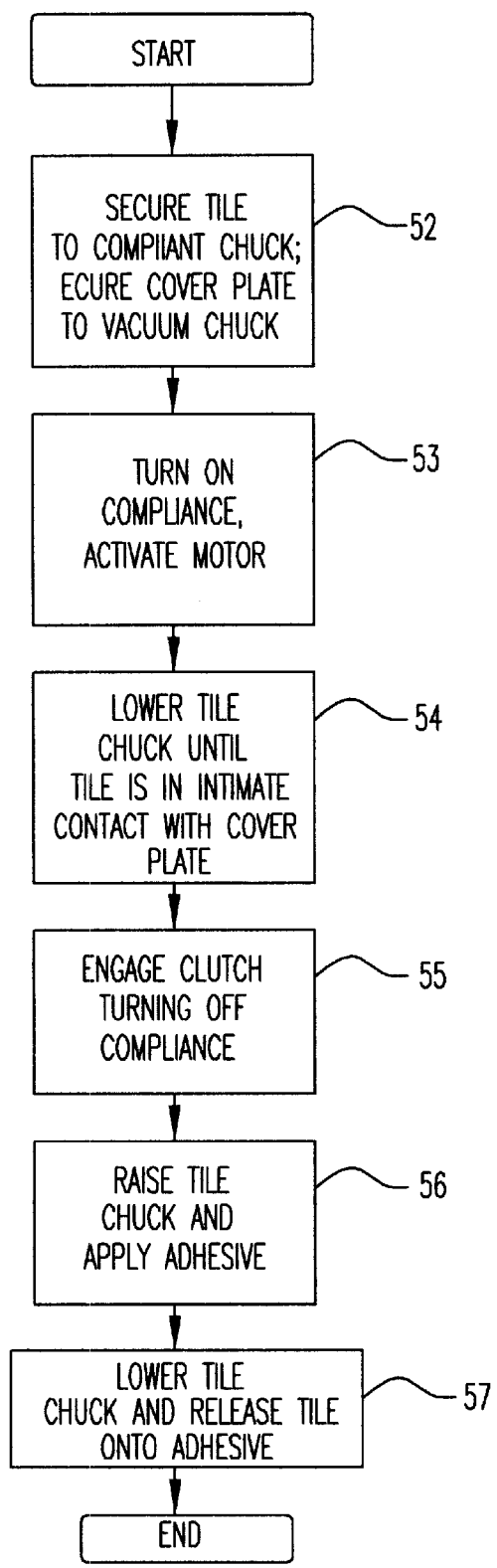
FIG. 2 is a flow diagram illustrating the steps of assembling tiles to a cover plate.

Referring to FIG. 2, there is shown a flow diagram illustrating the steps for assembling LCD tiles using the compliant chuck shown in FIG. 1. In operation, at block 52 a tile 22 is secured to the tile chuck 24 by a vacuum and a cover plate 10 is held in place by a vacuum on vacuum chuck 12. At block 53, the compliance is turned on (i.e., the pistons 48 are disengaged from the linear clutch 44) and the motor 30 is actuated to lower the tile chuck carrier 28. The tile 22 is brought into intimate contact with the cover plate 10, regardless of the tolerances on either the cover plate 10 or tiles 14 at block 54. This alignment is the "zero" gap position. A sensor 31 may be used to detect when alignment has been achieved. In block 55, the compliance is turned off (i.e., the pistons 48 are pressed into the linear clutch 44), locking the chucks 24 in this position. Then, at block 56, the tile chuck carrier 28 is raised. This allows for the dispensing of a transparent adhesive, as described for example in co-pending application Ser. No. 09/082,287. At block 57, the chuck carrier 28 returns the chucks with tiles to the cover plate 10, and lowers them onto the cover plate 10. The chuck carrier 28 has the ability to accurately lower the tiles onto the cover plate 10. The tiles are lowered to a position that is 0.004" higher than the "zero" gap position with lead screw 38. Thus, the accuracy between the tiles 22 and cover plate 10 is achieved. FIG. 1 shows one such compliant chuck, however it is understood that several such chucks may be placed within chuck housing 16. For example, four chucks may be arranges in a four-square pattern for assembling four LCD tiles to form a larger display.

In order to be successful, there cannot be any relative motion between the tile chuck 24 and the chuck carrier 28 while turning the compliance off. Otherwise, an error in the gap would occur. Further, there cannot be any compliance while turned off (no slippage), even under the relatively high resistance encountered while forcing the tiles into the adhesive.

Figure 3:
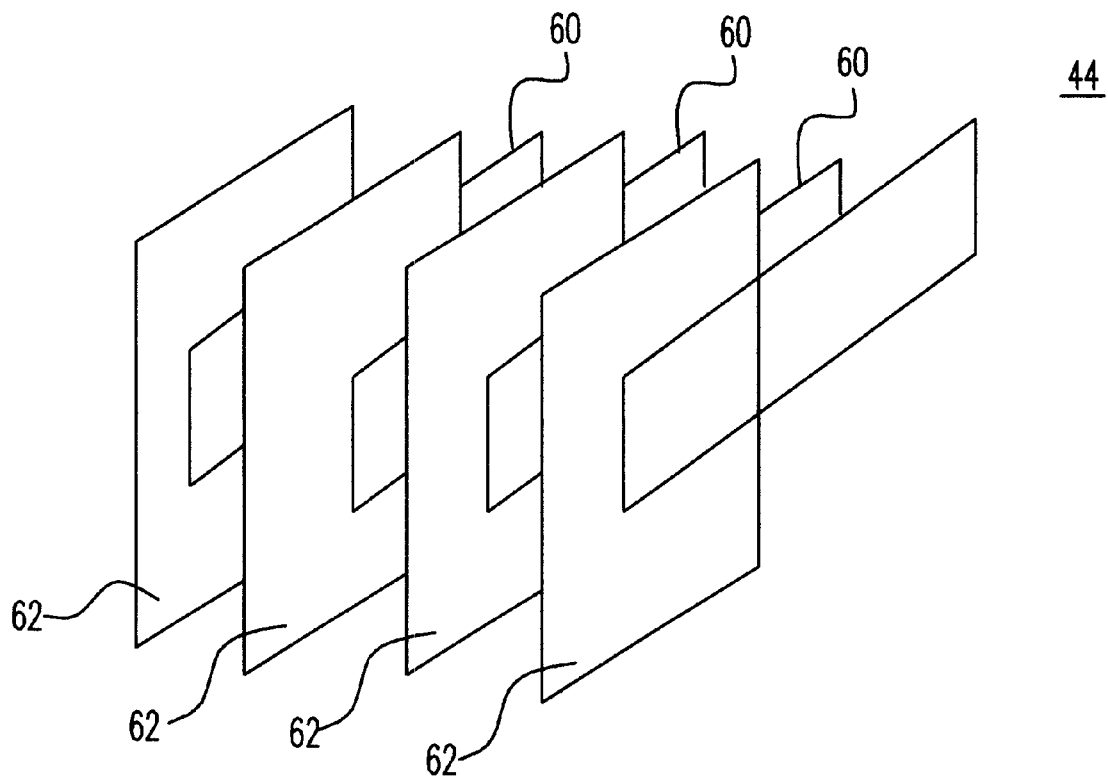
FIG. 3 is an enlarged view of the linear clutch shown in FIG. 1.

Referring to FIG. 3, in order to meet these criteria, a novel linear clutch design 44 was developed. This linear clutch 44 uses several meshing plates, half the plates 60 are attached to the tile chuck 24, the other half 62 are attached to the chuck carrier 28. There is minimal clearance between the plates, so that they are relatively free to slide against each other. But, when an even minor force is applied, squeezing the plates together, they become locked to each other. The degree of lock is a function of the friction coefficient between the plates 60 and 62, the force applied, and the number of plates in the mesh. For example, the plates could be made out of metal or plastic or any other suitable material. A typical arrangement could be thin (0.005") steel (friction coefficient of 0.8) plates arranged in 20 pairs. Thus, a five pound force between the plates results in an 80 pound force needed to cause a slip. Of course any number of plates may be used depending on the material composition of the plates and the locking force desired.

For optimum results, at least three of these clutches 44 are typically used per chuck (for simplicity of illustration, only two are shown), each mounted near the corners for the chucks. The engaging force could be developed by an electric solenoid, an air cylinder or a spring. In addition, if a spring is used for the engaging force, the air cylinder or solenoid could be used retract the spring.

While the invention has been described in terms of a single preferred embodiment, those skilled in the art will recognize that the invention can be practiced with modification within the spirit and scope of the appended claims.

We claim:

1. An apparatus for aligning a tile to a cover plate for constructing a flat panel display, comprising:
   a cover plate support for securely holding a cover plate;
   a compliant mount for securely holding a tile, said compliant mount comprising a first set of spaced plates;
   a tile chuck carrier comprising a second set of spaced plates interleaved with said first set of spaced plates;
   means for lowering said compliant mount over said cover plate support for aligning the tile and the cover plate; and
   means for squeezing together said first set of spaced plates and said second set of spaced plates for locking said compliant mount to said tile chuck carrier after alignment.

2. An apparatus for aligning a tile to a cover plate for constructing a flat panel display as recited in claim 1, wherein said means for lowering comprises a lead screw connected to said tile chuck carrier.

3. An apparatus for aligning a tile to a cover plate for constructing a flat panel display as recited in claim 1 wherein said means for squeezing comprises one of an air cylinder, a solenoid, and a spring.

4. An apparatus for aligning a tile to a cover plate for constructing a flat panel display as recited in claim 1 further comprising a tile position sensor for actuating said means for squeezing when the tile and the cover plate are aligned.

5. An apparatus for aligning a tile to a cover plate for constructing a flat panel display as recited in claim 1, wherein a number of said first set of spaced plates and said second set of spaced plates are chosen according to a desired locking force.

6. An apparatus for aligning a tile to a cover plate for constructing a flat panel display as recited in claim 1 wherein said first set of spaced plates and said second set of spaced plates comprise steel plates.

7. A selectively compliant chuck having a linear clutch comprising:
   a support comprising a first series of plates having gaps there between;
   a carrier comprising a second series of plates having gaps there between and interleaved with said first series of plates such that said support moves compliantly with respect to said carrier;
   means for applying a force to first set of plates and to said second set of plates to lock said carrier with respect to said support.

8. A selectively compliant chuck having a linear clutch as recited in claim 7 wherein said means for applying a force is an air cylinder.

9. A selectively compliant chuck having a linear clutch as recited in claim 7 wherein said means for applying force is a solenoid.

10. A selectively compliant chuck having a linear clutch as recited in claim 7 wherein a number of said first series of plates and said second series of plates a chosen according to a desired locking force.

11. A selectively compliant chuck having a linear clutch as recited in claim 7 wherein said first series of plates and said second series of plates comprise steel plates.

12. A method for aligning a tile to a cover plate for assembling a flat panel display, comprising the steps of:
   securing a cover plate to a cover plate support;
   securing a tile to a mount;
   connecting said mount to a carrier with a clutch mechanism comprising interleaved plates;
   lowering said mount with said tile over said cover plate, wherein clutch slippage permits said tile to compliantly align with said cover plate;
   squeezing said plates together to lock said clutch mechanism and said tile in place; and
   raising said mount with said tile with said clutch locked such that relative alignment between said tile and said cover plate is preserved.

13. A method for aligning tile mating surfaces to cover plate mating surfaces for assembling a flat panel display as recited in claim 12, further comprising the steps of:
   applying an adhesive to said cover plate;
   lowering said mount with said tile over said adhesive with said clutch in a locked position; and
   releasing said tile.

* * * * *